United States Patent
Vogel et al.

(10) Patent No.: US 10,839,099 B2
(45) Date of Patent: Nov. 17, 2020

(54) GENERAL DATA PROTECTION REGULATION (GDPR) INFRASTRUCTURE FOR MICROSERVICES AND PROGRAMMING MODEL

(71) Applicant: SAP SE, Walldorf (DE)

(72) Inventors: Matthias Vogel, Saarbrücken (DE); Thorsten Bruckmeier, Walldorf (DE); Francesco Di Cerbo, Antibes (IT)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 15/818,695

(22) Filed: Nov. 20, 2017

(65) Prior Publication Data

US 2019/0156053 A1 May 23, 2019

(51) Int. Cl.
*G06F 21/00* (2013.01)
*G06F 21/62* (2013.01)
*G06Q 50/18* (2012.01)

(52) U.S. Cl.
CPC ......... *G06F 21/6245* (2013.01); *G06Q 50/18* (2013.01)

(58) Field of Classification Search
CPC .................. G06F 21/6245; G06Q 50/18
See application file for complete search history.

(56) References Cited

U.S. PATENT DOCUMENTS

| 9,632,713 B2* | 4/2017 | Mutha | G06F 3/06 |
| 2017/0140174 A1* | 5/2017 | Lacey | G06F 21/6245 |
| 2018/0063181 A1* | 3/2018 | Jones | H04L 63/1433 |
| 2018/0159884 A1* | 6/2018 | Meier | H04L 43/045 |

* cited by examiner

*Primary Examiner* — Kendall Dolly
(74) *Attorney, Agent, or Firm* — Mintz Levin Cohn Ferris Glovsky and Popeo, P.C.

(57) ABSTRACT

A system for protecting personal data is disclosed. The system includes a general data privacy regulator module having a dataflow controller configured to monitor data communicated to and from one or more business applications, and having a retention engine configured to retain personal information from the data communicated to and from the business application according to at least one data privacy regulation. The system further includes a data privacy compliance module connected with the general data privacy regulator module, and configured with the data privacy regulation to monitor the dataflow controller and report to a client computer. The system further includes a data subject privacy request module connected with the general data privacy regulator module and the data privacy compliance module, and configured to receive one or more requests from the cloud computing platform about a data subject stored by the business application and generate an action based on the one or more requests.

15 Claims, 2 Drawing Sheets

GENERAL DATA PROTECTION REGULATION (GDPR) INFRASTRUCTURE FOR MICROSERVICES AND PROGRAMMING MODEL

TECHNICAL FIELD

The subject matter described herein relates to systems and methods for general data protection regulation, and more particularly to an infrastructure for microservices and programming model to execute the general data protection regulation.

BACKGROUND

General Data Protection Regulations (GDPR) requires a data controller (i.e., a unit responsible personal data, mostly the owner of a cloud platform application) and a data processor (i.e., an enterprise that runs the application) to handle personal data in accordance with strict controls and guidelines. GDPR requires the data controller and data processor to maintain some form of contact with a data subject (i.e. a person) to give that person the possibility to control a usage of his/her data, which includes all kinds of data to identify the data subject. Such data is known as Personal Identifiable Information (PII), or more simply "personal data."

The GDPR specifies that the data subject has certain rights, which must be fulfilled by the data controller. These rights include the right to be forgotten: use of personal data is only allowed for the data controller if the data subject gives consent or if another legal ground exists for such use. If the legal ground no longer exists, the personal data must be deleted automatically. Additionally, the data subject can withdraw their consent at any time by request, an upon such request, the data must be deleted as soon as possible.

The rights under the GDPR further include a right of a data subject to own their data. The data subject can request information about his/her personal data and any related data stored in the system, hereinafter referred to as "personal data." The data subject has the right to request corrections on his/her data, and the right to request a transfer of the data to another data controller. According to the GDPR, the data subject must be personally informed in case of a data loss effecting personal data.

Further, the data controller has to guarantee and show fulfillment of the GDPR provisions. In case of a data protection assessment, the data controller must be able to show its compliance by answering questions, which can include, without limitation: what personal data is stored in the system; who had access to which personal data; who had changed which personal data; and how is personal data protected in the system. Other questions can include: why does a user have the right to store personal data; how long does the user store personal data; what happens with personal data when a contract ends; is the user able to react on data subject request; is the user able to inform effected data subject in case of data loss; and is personal data moved between countries or continents, i.e. from Europe to USA.

One single application is hardly able to fulfill all these requirements, because an overview of all personal data usages is outside of this application if a second application with personal data is used by the same data controller.

SUMMARY

This document describes an infrastructure and various necessary components for an application(s)-hosting cloud computing platform to fulfill requirements deriving from the General Data Protection Regulation (GDPR). When these components are available, the applications themselves are responsible to implement their required interfaces to interact with these components. For business applications that will use core data services (CDS) and the proposed programming model, most of these requested interfaces can be derived out of the data description. For those applications that do not us CDS, this document describes capabilities for correct handling of personal data into their application.

In one aspect, a system for protecting personal data in a business application hosted in a cloud computing platform is described. The system includes a general data privacy regulator module having a dataflow controller configured to monitor data communicated to and from the business application, and having a retention engine configured to retain personal information from the data communicated to and from the business application if the personal information is required by a data privacy regulation and to delete personal information not required by the data privacy regulation. The system further includes a data privacy compliance module connected with the general data privacy regulator module, the data privacy compliance module being configured with the data privacy regulation to monitor the dataflow controller and report to a client computer. The system further includes a data subject privacy request module connected with the general data privacy regulator module and the data privacy compliance module, the data subject privacy request module being configured to receive one or more requests from the cloud computing platform about a data subject stored by the business application, and generate an action based on the one or more requests.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an system for protecting personal information used by a suite of business applications, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes an infrastructure and various necessary components for an application(s)-hosting cloud computing platform, such as the SAP Cloud Platform (SCP) by SAP S.E. of Walldorf Germany, to fulfill requirements deriving from the GDPR. When these components are available, the applications themselves are responsible to implement their required interfaces to interact with these components. For business applications that will use CDS and the proposed programming model, most of these requested interfaces can be derived out of the data description. For those applications that do not us CDS, this document describes capabilities for correct handling of personal data into their application.

Figure 1:
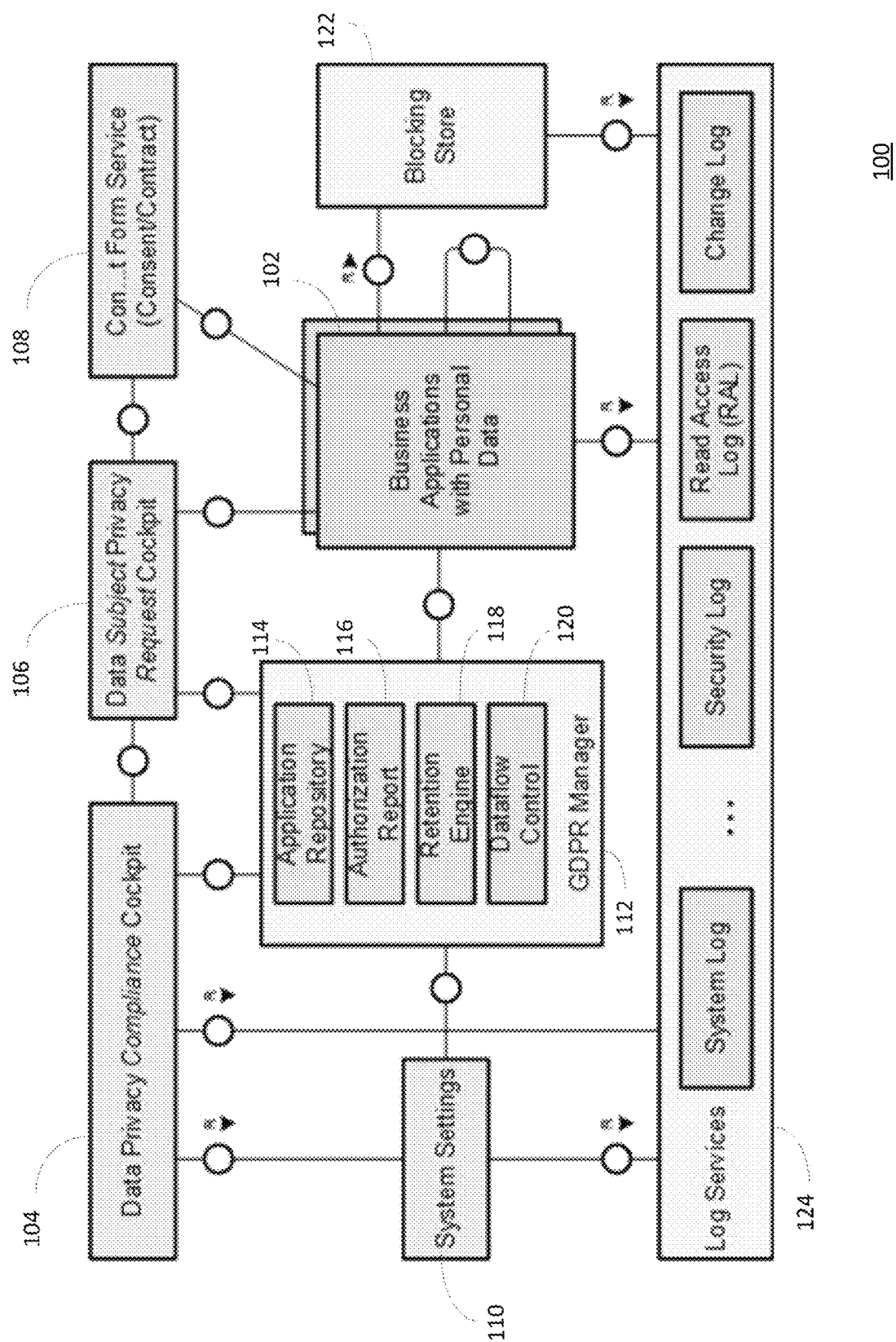
FIG. 1 is a system block diagram of architecture 100 to illustrate the building blocks for GDPR fulfillment.

FIG. 1 is a system block diagram of architecture 100 to illustrate the building blocks for GDPR fulfillment. The core of the reference architecture is business application(s) 102. The surrounding infrastructure allows developers to build business applications 102 which contain personal data in a GDPR-compliant way. The architecture 100 further includes a data privacy compliance cockpit 104. In case of a data privacy audit, the data controller must be able to show that all GDPR requirements are well implemented in the environment. The data privacy compliance cockpit 104 generates, stores and provides an overview about the usage of personal data in combination with the whole technical infrastructure. It also contains basic capabilities to react on GDPR related requests from the data subject or other subrogation.

The architecture 100 further includes a data subject privacy request cockpit 106. On request of the data subject itself, some actions need to be triggered. Because of cloud business, this component must be well prepared for self-service. The categories of the requests are:

Information: Collect all personal data in the system about the data subject together with the purpose of use and the legal ground (e.g. the consent) and send this report back to the data subject.

Correction: The data subject can force the data controller to change the personal data if they are stored with mistakes e.g. with a typo.

Consent changes: The data subject can change or withdraw his consent any time. This can trigger some deletions in the system.

Deletion: If a deletion is requested, the data must be eliminated or anonymized in the application as early as possible. More details about this process you be found in the following parts of this document. The deletion process can become very complex.

Transportation: A transport request to another data controller can be triggered by the data subject.

The architecture 100 further includes a consent/contract form service 108 that handles and organizes legal grounds for all purposes for using personal related data. The business application must derive retention, residence and blocking periods for personal data from this information. The basic legal grounds are consent and contract, but can also include access and imposition of regulations, for example. All changes that can influence the ability of the infrastructure to fulfill the GDPR is handled by a system settings module 110. The system settings module 110 must be part of the data privacy compliance cockpit 104 to access the current system settings and the history of system changes.

The architecture 100 further includes a GDPR manager 112, which collects information about all business applications for the data privacy cockpits 104 and 106. The GDPR manager 112 includes an application repository 114 that stores a list of all business applications that deal with personal data, and an authorization report module 116 that reports about the authorizations that protect the personal data, and can calculate all potential users that have access to the personal data. The GDPR manager 112 further includes a retention engine 118: personal data must be deleted if there is no longer of a legal ground given. Most of the legal grounds include a time period that describes when the purpose is out dated. By reaching this date, an automatic deletion must be triggered to all effected applications. Finally, the GDPR manager 112 includes a dataflow control module 120 to show compliance with the international data transfers provisions stated by GDPR. For instance, the movement of personal data from one data center in Europe to one datacenter in USA is not allowed. To make this transfer possible an anonymization of the data must be done prior to such transfer. Often the personal data does not stay only in the original application. If, for example, a mail-service is integrated, the name and the email address is passed over to the dataflow control module 120. With this information, it is necessary for GDPR to include the mail-service in the list of applications that have to be controlled by the data privacy compliance cockpit 104.

The architecture 100 further includes a blocking store 122, which is a connected archive system. If a deletion referring to GDPR is triggered, other legal grounds, such as a financial audit, may forbid deletion of this data. To fulfill both regulation requirements, the data will be moved to the blocking store 122. In case of a financial audit, the data of the application and the data form the blocking store 122 must be taken into account.

The architecture 100 further includes a log services module 124. Applications can generate a large number of logs during runtime. This is necessary to fulfill enterprise requirements such as fulfillment of security standards. GDPR requires two additional kinds of logs, where all action on personal data are logged: first, a read access log (RAL), in which all data that will be transferred to a client are basically readable to the user of the client. All read actions on sensitive data, such as health data, political relations, sexual orientation, etc., must be logged, and this log will be used by the data privacy compliance cockpit 104 to show the usage of the personal data; and second, a change log (CL), which logs all changes on personal data. Generally speaking, while from a log point of view there is no big different between the RAL and the CL, the implementation is on opposite sides of the application architecture. Of further importance is that the log message destination fulfills all audit requirements e.g. the messages are not changeable by an attacker.

The building blocks of the reference architecture allow for parallel development to build the infrastructure that fulfills the GDPR requirements. Next, the interfaces and the processes between these buildings blocks will be described. With this reference architecture, the interfaces are a kind of team communication request.

Assuming all GDPR related services as described above are available, each business application 102 must support the necessary interfaces. To reduce the effort of developing these interfaces and increase the quality of the fulfillment of the GDPR, CDS can be used as a data definition language. The CDS structure can be enhanced with data privacy meta information (Data Privacy Annotations). With this meta information, libraries and frameworks can be offered for the business application developer handle GDPR with minimal knowledge about data privacy details or requirements.

Figure 2:
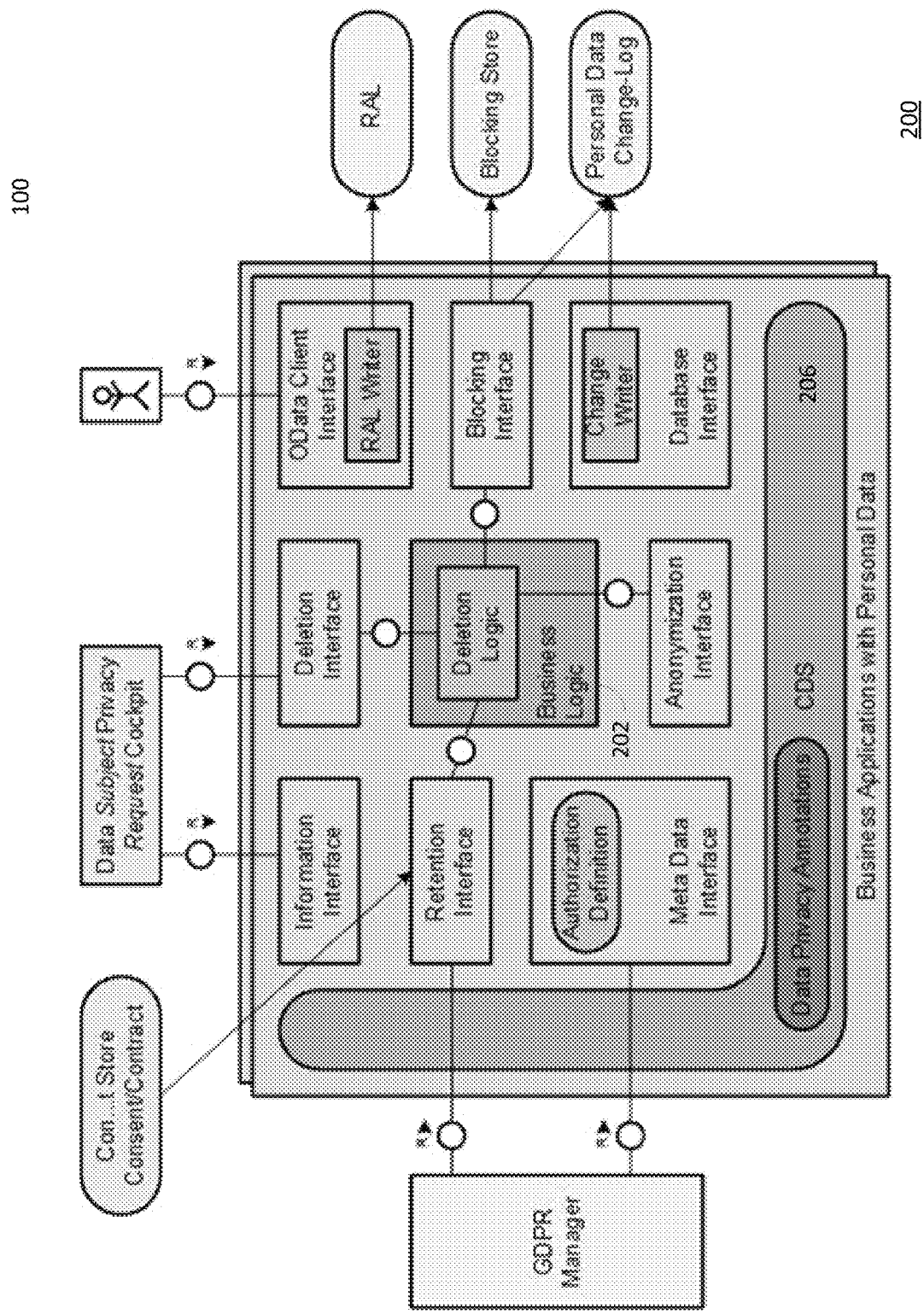
FIG. 2 is a system block diagram of architecture 200 for business applications with personal data content.

FIG. 2 is a system block diagram of architecture 200 for business applications with personal data content. The architecture 200 includes business logic 202 and a CDS structure 206. The CDS structure 206 describes the data structure used for the business logic 202, and in which all personal related data are tagged with special personal data annotations. The CDS structure 206 further includes data privacy annotations 208, which provide annotations to a framework for the programming model and some libraries to fulfill automatically most of the interfaces for the GDPR-specific components.

The architecture 200 includes an information interface 210. On request, the data controller must show personal data that is stored about the requesting data subject. The information interface 210 is configured to find the data of a specific person, e.g. if a user asks for information by phone, the personal data must be found by query with first and last name. The architecture 200 further includes a deletion interface 212. On request the data controller is legally obligated to delete all data about the data subject. This could end in a complex tradeoff decision, because conflicting legal grounds like a financial audit or support contracts do not allow the simple deletion. Therefore, the deletion interface 212 includes complex deletion logic that can be triggered, and the data subject need to be informed about the result.

The architecture 200 further includes an OData Client Interface 214, through which all application data that is requested by the client will pass. All personal data requested by clients need to be logged in a special log store, called a RAL writer 216, which persists the read access in a specific log, the RAL log 217. Each entry contains: who accesses, when, which personal data, over what client, for what purpose and if known why. This log can eventually contain personal data, and must also be handled under GDPR constraints.

The architecture 200 further includes a retention interface 218 that will trigger a deletion, and delete, personal data if one of the legal grounds that allow the application to store personal data is outdated. The architecture 200 further includes a blocking interface 220 for receiving and storing data that may need to be deleted from the application. If the application is no longer allowed to keep the data in its runtime store, it must delete or anonymize them. If there are other legal grounds that force the data controller to keep the data for a longer period, the data must be stored but also blocked. This is often the case if the personal data is related to financial transactions, and the legal ground to keep the data is the ability to make a financial audit. The blocking interface 220 to the blocking store allows data access only under special conditions so that the blocked data is not visible under normal conditions.

The business logic 202 includes deletion logic 222 includes, which combines business logic about deletion with GDPR requirements. The application may determine if deletion or anonymization is the way to fulfill a deletion requirement. The architecture 200 further includes a metadata interface 224, which generates or provides metadata about the use of personal data in an associated business application, such as connectivity to other applications, authorization enforcement technics to safeguard the personal data, etc. This is necessary to be compliant to GDPR. The metadata is derived from the implementation to make sure that new versions of the business application reflect that personal data, and changes thereto, are handled appropriately. All personal data must be protected by authorization, and therefore the metadata interface 224 includes an authorization definition module 226. The authorization definition used in the application must be reported to the GDPR Manager.

The architecture 200 further includes an anonymization interface 228 that allows the access on the data like the access on data that are not under GDPR control, and to provide other applications a feature of consuming the personal data in another legal location for e.g. BW requirements. The architecture 200 further includes a database interface 230, from which all changes on personal data will be reflected in database actions. The log about personal data changes contains again personal data (as the RAL-Log). This log contains also sensitive data in terms of GDPR and must be separated from the changelog about other data changes. Accordingly, the database interface 230 includes a specific log-writer, referred to herein as a change writer 232, which writes all changes on personal data to a specific log, such as a personal data change-log specifically established for a business application.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for protecting personal data in an application hosted in a cloud computing platform, the system comprising:
    at least one processor; and
    at least one memory including program code which when executed by at least one processor cause at least:
        a general data privacy regulator module having a dataflow controller, an authorization report module, a retention engine, and an application repository, the data flow controller configured to monitor data communicated to and from the application, the authorization report module configured to report about authorization in place to protect the personal data and to determine one or more potential users having access to the personal data, the retention engine configured to retain personal data from the data communicated to and from the application if the personal data is required by a data privacy regulation and to delete personal data not required by the data privacy regulation, the application repository storing a list of at least the application having personal data;
        a data privacy compliance module connected with the general data privacy regulator module, the data privacy compliance module being configured, with the data privacy regulation, to monitor the dataflow controller and report to a client computer; and
        a data subject privacy request module connected with the general data privacy regulator module and the data privacy compliance module, the data subject privacy request module being configured to receive one or more requests from the cloud computing platform about a data subject stored by the application, and generate an action based on the one or more requests, the one or more requests indicating a request for one or more of the following: information about the data subject, purpose of use of the personal data, consent information to use the personal data, a change to the personal data, withdrawal of consent to use the personal data, deletion of the personal data, anonymization of the personal data, and transport to another data controller.

2. The system in accordance with claim 1, further comprising:
    a consent form service module configured to generate an electronic consent form in accordance with legal rules, the electronic consent form being deliverable to a user related to the personal data.

3. The system in accordance with claim 1, further comprising a system settings module configured to handle settings and changes to the settings of the general data privacy regulator module.

4. The system in accordance with claim 1, further comprising a log services module in communication with the application and configured to provide a read access log (RAL) to log read actions by a client, and a change log (CL) to log changes to personal data.

5. The system in accordance with claim 4, wherein the log services module further includes a security log to log security events.

6. A method for protecting personal data in an application hosted in a cloud computing platform, the method comprising:
- monitoring, by a dataflow controller of a general data privacy regulator module, data communicated to and from the application, the general data privacy regulator module including the dataflow controller, an authorization report module, a retention engine, and an application repository;
- reporting, by the authorization report module, about authorization in place to protect the personal data and to determine one or more potential users having access to the personal data;
- retaining, by the retention engine, personal data from data communicated to and from the application if the personal data is required by a data privacy regulation and to delete personal data not required by the data privacy regulation;
- storing, by the application repository, a list of at least the application having personal data;
- monitoring, by a data privacy compliance module being configured with the data privacy regulation, the dataflow controller and report to a client computer, the data privacy compliance module connected with the general data privacy regulator module; and
- receiving, by a data subject privacy request module connected with the general data privacy regulator module and the data privacy compliance module, one or more requests from the cloud computing platform about a data subject stored by the application, and generate an action based on the one or more requests, the one or more requests indicating a request for one or more of the following: information about the data subject, purpose of use of the personal data, consent information to use the personal data, a change to the personal data, withdrawal of consent to use the personal data, deletion of the personal data, anonymization of the personal data, and transport to another data controller.

7. The method in accordance with claim 6, further comprising:
- generating, by a consent form service module, an electronic consent form in accordance with legal rules, the electronic consent form being deliverable to a user related to the personal data.

8. The method in accordance with claim 6, further comprising:
- handling, by a system settings module, settings and changes to the settings of the general data privacy regulator module.

9. The method in accordance with claim 6, further comprising:
- providing, by a log services module in communication with the application, a read access log (RAL) to log read actions by a client, and a change log (CL) to log changes to personal data.

10. The method in accordance with claim 9, wherein the log services module further includes a security log to log security events.

11. A non-transitory computer-readable storage medium including program code which when executed by at least one processor causes operations comprising:
- monitoring, by a dataflow controller of a general data privacy regulator module, data communicated to and from the application, the general data privacy regulator module including the dataflow controller, an authorization report module, a retention engine, and an application repository;
- reporting, by the authorization report module, about authorization in place to protect the personal data and to determine one or more potential users having access to the personal data;
- retaining, by the retention engine, personal data from data communicated to and from the application if the personal data is required by a data privacy regulation and to delete personal data not required by the data privacy regulation;
- storing, by the application repository, a list of at least the application having personal data;
- monitoring, by a data privacy compliance module being configured with the data privacy regulation, the dataflow controller and report to a client computer, the data privacy compliance module connected with the general data privacy regulator module; and
- receiving, by a data subject privacy request module connected with the general data privacy regulator module and the data privacy compliance module, one or more requests from the cloud computing platform about a data subject stored by the application, and generate an action based on the one or more requests, the one or more requests indicating a request for one or more of the following: information about the data subject, purpose of use of the personal data, consent information to use the personal data, a change to the personal data, withdrawal of consent to use the personal data, deletion of the personal data, anonymization of the personal data, and transport to another data controller.

12. The non-transitory computer-readable storage medium in accordance with claim 11, further comprising:
- generating, by a consent form service module, an electronic consent form in accordance with legal rules, the electronic consent form being deliverable to a user related to the personal data.

13. The non-transitory computer-readable storage medium in accordance with claim 11, further comprising:
- handling, by a system settings module, settings and changes to the settings of the general data privacy regulator module.

14. The non-transitory computer-readable storage medium in accordance with claim 11, further comprising:
- providing, by a log services module in communication with the application, a read access log (RAL) to log read actions by a client, and a change log (CL) to log changes to personal data.

15. The non-transitory computer-readable storage medium in accordance with claim 14, wherein the log services module further includes a security log to log security events.

* * * * *